July 28, 1936.     R. J. ALTGELT ET AL     2,048,914
IMPLEMENT ATTACHMENT FOR CRAWLER TRACTORS
Filed Sept. 21, 1933     2 Sheets-Sheet 1
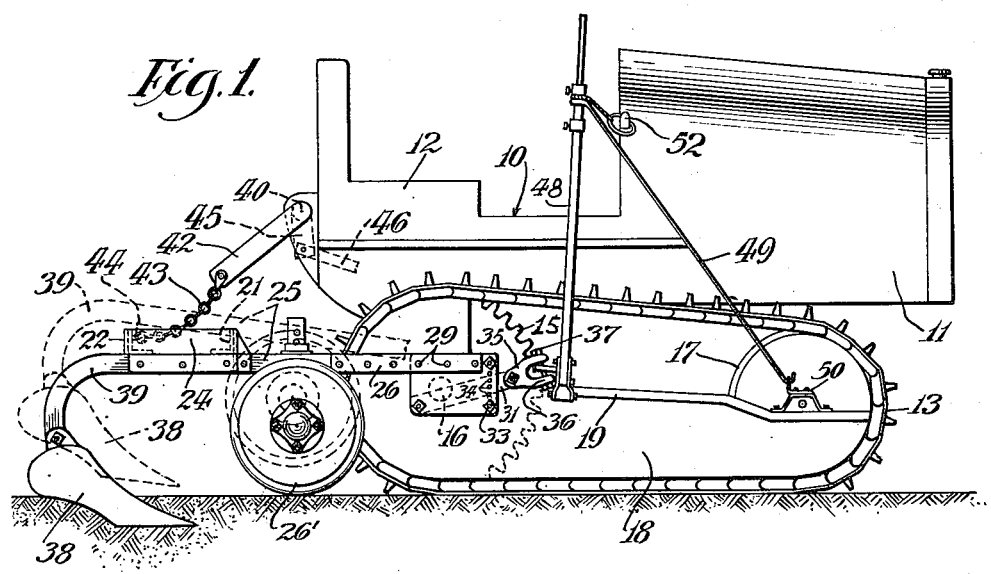
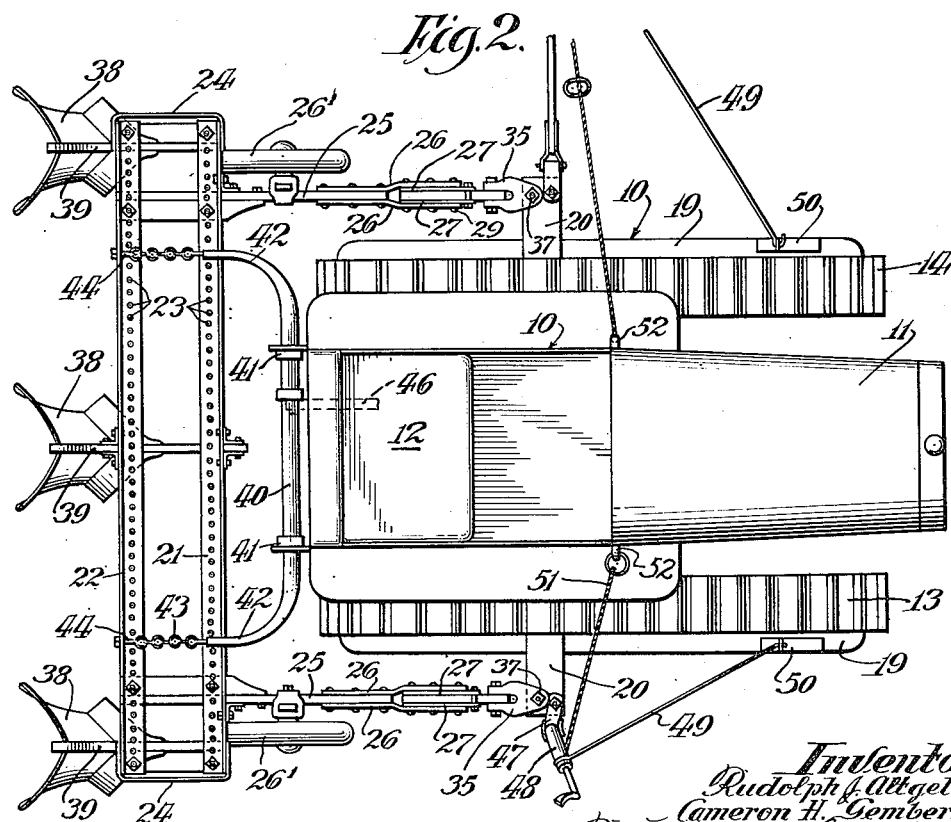

July 28, 1936.  R. J. ALTGELT ET AL  2,048,914
IMPLEMENT ATTACHMENT FOR CRAWLER TRACTORS
Filed Sept. 21, 1933  2 Sheets-Sheet 2

Inventors:
Rudolph J. Altgelt,
Cameron H. Gemberling,
By John P. Smith
Attys.

Patented July 28, 1936

2,048,914

UNITED STATES PATENT OFFICE 2,048,914

IMPLEMENT ATTACHMENT FOR CRAWLER TRACTORS

Rudolph J. Altgelt and Cameron H. Gemberling, South Bend, Ind., assignors to Oliver Farm Equipment Company, a corporation of Delaware Application September 21, 1933, Serial No. 690,318

13 Claims. (Cl. 97—47)

The present invention relates generally to implement attachments for tractors, but more particularly to a universal unit attachment through the medium of which a variety of agricultural earth working tools may be attached to a crawler type of tractor.

Heretofore it has always been a problem to secure an even or uniform depth penetration of earth working tools attached to or carried by a crawler type tractor for the reason that the galloping movement of this type of tractor where it encounters uneven soil is imparted to the implement attached thereto. In other words, as the crawler type tractor travels over a ridge or small elevation on the surface of the soil, the front end of the tractor is raised or elevated until the ridge or high spot is under the tractor, then the front end of the tractor drops down to the ground and the rear end of the tractor is raised or elevated off the ground, causing the earth working implement attached to the tractor to secure an unsatisfactory or uneven penetration of the ground. It is therefore one of the primary objects of our invention to overcome this difficulty by providing a novel flexible connection between the tractor and the universal unit to which a variety of earth working tools may be attached.

Another object of the present invention is to provide a novel and improved form of universal unit attachment for crawler type tractors in which a variety of earth working tools may be attached or fastened thereto. The unit in this instance for example is adapted to carry listers, cultivator shovels, sweeps, spring teeth, discs, etc.

A still further object of the present invention is to provide a novel and improved universal unit attachment for crawler type tractors in which the unit is floatingly connected at its forward end at an intermediate point in the longitudinal length of the tractor. The connection at this point with the tractor reduces to a minimum the up and down movement which is occasioned by this type of tractor when it travels over a ridge or other small elevation on the surface of the soil. For example, the front end of the crawler type tractor first rises when passing over a ridge until the ridge or high spot is under the tracks, then the front end of the tractor drops down to the ground and the rear end of the tractor is raised off the ground.

A still further object of the invention is to provide a novel and improved construction of a universal unit attachment to which a variety of ground working tools may be carried thereby so that the tools thereof may travel at a uniform or even depth penetration of the soil regardless of the up and down movement occasioned by this type of tractor.

These and other objects are accomplished by providing a construction and arrangement of the parts in the manner hereinafter described and particularly pointed out in the appended claims.

Referring to the drawings:

Fig. 1 is a side elevational view of the conventional form of a crawler type tractor showing our universal unit flexibly connected thereto;

Fig. 2 is a top plan view of the same;

Figure 3:
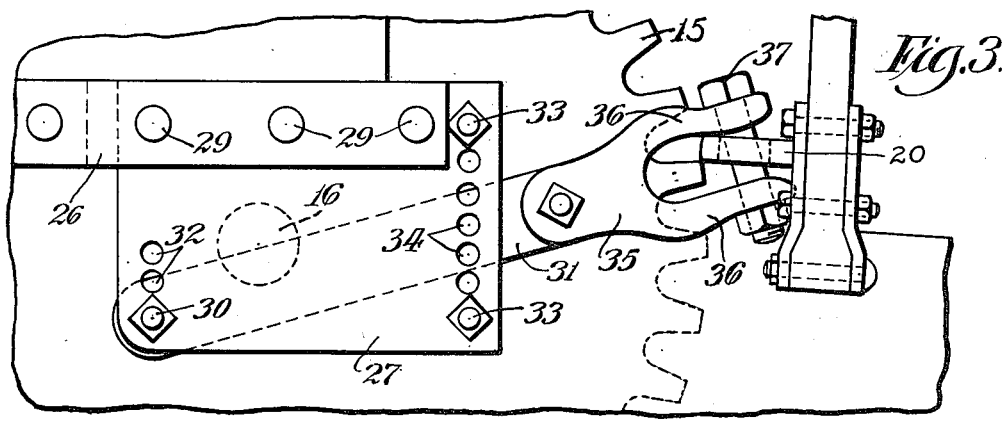
Fig. 3 is a fragmentary enlarged side elevational view showing our improved flexible connection between the unit and the tractor.
Figure 4:
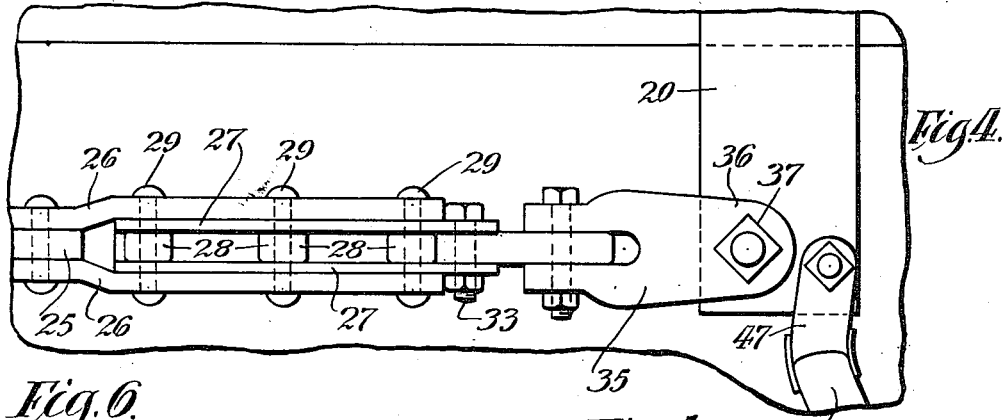
Fig. 4 is a top plan view of the same.
Figures 5, 6:
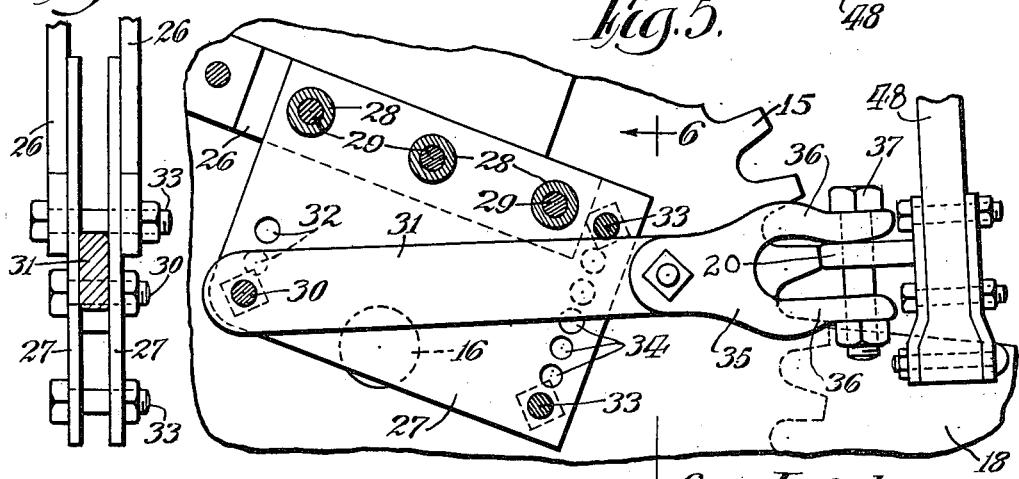
Fig. 5 is an enlarged fragmentary cross sectional view taken between the plates of the flexible connection.
Fig. 6 is a cross sectional view taken on the line 6—6 in Fig. 5.

We have shown our invention in connection with a conventional form of crawler tractor, generally indicated by the reference character 10. This crawler type tractor comprises, briefly, an engine which is mounted under the hood 11 of the tractor and an operator's seat 12. The crawler tractor is provided with the conventional endless tracks generally indicated by the reference characters 13 and 14 located on the opposite sides and which are driven by the sprockets 15 secured to the main drive shaft 16. The main drive shaft 16 is driven by the engine of the tractor in the conventional manner well understood in the art. The forward end of each of the endless tracks 13 and 14 are trained about the idle rollers or wheels 17. Extending between the roller 17 and the traction sprockets 15 are frame members 18. Bolted to each of these frame members 18 are flange members 19. Secured to each of the flange members 19 at a point substantially the center of the longitudinal length of each of the tracks are outwardly projecting draft plates 20.

Our improved earth working tool carrying universal unit comprises front and rear spaced apart transversely extending angle members 21 and 22 respectively. These angle members are provided with a multiplicity of spaced apart apertures, as shown at 23, throughout their entire length so that spring teeth may be attached thereto at close intervals or any variety of earth working tools such for example, as lister bases, cultivating shovels, sweeps, etc. The outer ends of these transverse members 21 and 22 are secured together by longitudinally extending angle members 24. Secured adjacent the outer end of the unit frame members 21 and 22 and positioned outside each of the endless tracks 13 and 14, are longitudinally extending draft beams 25. Secured at intermediate portions of these draft beams for vertical adjustment with respect thereto, are gauge wheels, generally indicated by the reference character 26'. These gauge wheels may be vertically adjusted in any well known manner with respect to the respective draft beams 25 for regulating the depth penetration of the earth working tools carried by the unit. Secured to the forward end of and on the opposite sides of each of the draft beams 25 are forwardly extending offset steel straps 26. Secured to the inner sides and forward ends of each of these steel straps 26, are downwardly extending spaced apart steel plates 27. These plates are held in spaced relation with respect to each other by spacer collars 28 and secured together by rivets 29. Our improved earth working tool carrying unit is flexibly connected to the tractor in the following manner. Pivoted between each pair of plates on the opposite sides of the tractor, as shown at 30, are draft links 31. The pivots 30 of these draft links may be vertically adjusted in a series of holes 32 for raising or lowering the draft connection with respect to the universal unit. The forward ends of the draft links 31 are limited in their relative pivotal movement with respect to their pivots by spaced apart bolts 33 which may be adjusted in a variety of holes 34 for limiting the flexibility of the connection between the tractor and the draft unit. Secured to the forward ends of each of the draft links 31 are draft shackles 35. These draft shackles are provided with bifurcated portions, as shown at 36, between which are inserted the draft plates 20. These draft shackles are loosely connected to the draft plates 20 by means of bolts 37. Obviously the draft beams 25 and their extensions 26 are flexibly or floatingly connected to their respective draft plates 20 through the medium of the pivoted links 31. This flexing or floating movement of the draft beams is limited to the extent of the movement of the links 31 between the adjustable bolts 33. In other words, the draft members have a relative movement with respect to the track frames of the tractor so that the tools carried by the unit may secure a uniform depth penetration of the ground regardless of the position of the tractor.

In the drawings we have illustrated three spaced apart listers 38 which are attached to the unit or frame members 21 and 22 by tool beams 39, but it will of course be understood that various other types of earth working tools may be attached thereto in the manner previously described. The unit as well as the gauge wheels and the implements attached thereto may be lifted by the power of the tractor through the medium of the crank shaft 40 mounted in suitable spaced apart bearings 41 attached to the tractor frame. The crank shaft 40 is provided with cranks 42 on the outer ends thereof which, in turn, are connected by chains 43 to the rear unit frame member 22 as shown at 44. The crank shaft 40 is provided with a downwardly extending crank 45 which has its free end pivotally connected by means of a link 46 to any conventional form of a power lift mechanism. Pivotally connected by means of brackets 47 attached to the opposite plates 20 are marker arms 48 which in turn are braced against longitudinal movement by connecting rods 49 which are pivoted at their forward ends to brackets 50, secured adjacent the forward ends of the flanges 19. These marker arms on the opposite sides are controlled by the operator on the seat of the tractor through the medium of a rope 51 adapted to be connected to hooks 52 on each side of the tractor.

It will of course be obvious from the above description of our improved flexible connection of earth working unit with the crawler type tractor that by reason of its pivoted draft links 31 adapted to float within the limits of the stops or bolts 33 in the plates 27 that the lister plows or other earth working implements attached to the unit, will be maintained at a uniform or even depth penetration of the soil regardless of the galloping movement of the crawler type tractor occasioned by the unevenness of the surface of the soil. The arrangement of flexibly connecting the draft members to the opposite sides of the tractor permits either side of the unit to be raised or lowered independently of the other side as the units travel over uneven ground. It will also be obvious from the above specifications and drawings that the line of draft may be changed with respect to the unit by raising or lowering the adjustable pivots of the links 31 and the depth penetration of the tools in the soil may be regulated by adjusting the gauge wheels of the unit.

The definition of the words "flexible connection" throughout the specification and claims refers to those movable members which connect the unit with the side frame members of the crawler tractor so as to permit the forward ends of the draft members to move up and down relative to the tractor as the tractor travels over uneven ground.

While in the above specification we have described one embodiment which our invention may assume in practice, it will of course be understood that the same is capable of modification and that modification may be employed without departing from the spirit and scope of the invention as expressed in the following claims.

What we claim as our invention and desire to secure by Letters Patent is:

1. The combination of a crawler type tractor including vertical side frames, endless tracks trained about said frames, of an implement carrying unit attached thereto, wheels for supporting said unit, an implement attached to and extending rearwardly of said unit connections between said units and said frames, and means associated with said connections whereby said tractor may move vertically without disturbing the position of said unit.

2. The combination with a crawler type tractor having track frames on the opposite sides thereof, of an earth working tool carrying unit attached thereto, an earth working tool carried by said unit and extending rearwardly therefrom and means pivoted to said unit and to intermediate points of the track frames of said tractor for flexibly connecting said unit to said tractor.

3. The combination with a crawler type tractor having track frames on the opposite sides thereof, of an earth working tool carrying unit including a wheel supported frame, with working tools mounted on said frame, and means for flexibly connecting said unit to intermediate points on the track frames of said tractor.

4. The combination with a crawler type tractor including vertical side frames and endless tracks trained about said frames, of an earth working tool carrying unit attached thereto for supporting a variety of tools, forwardly extending draft members secured to said unit outside said track frames, and draft links pivoted to said draft members and pivotally connected to said track frames for flexibly connecting said unit to said tractor.

5. The combination with a crawler type tractor including vertical side frames and endless tracks trained about said frames, of an earth working tool carrying wheeled frame unit attached thereto, forwardly extending draft members secured to said unit outside said track frames, and adjustable draft links pivoted to said draft members and pivotally connected to said track frames for flexibly connecting said unit to said tractor.

6. The combination with a crawler type tractor including vertical side frames and endless tracks trained about said frames, of an earth working tool carrying wheeled frame unit attached thereto, forwardly extending draft members secured to said unit outside said track frames, draft links pivoted to said draft members and pivotally connected to said track frames, and means for limiting the pivotal movement of said draft links.

7. The combination with a crawler type tractor including vertical side frames and endless tracks trained about said frames, a universal earth working tool carrying wheeled frame unit attached thereto, said unit comprising a frame, two forwardly extending draft members secured to said last named frame and located outside said track frames, spaced apart plates secured to the forward ends of each of said draft members, and links pivoted to said plates below said draft members and having their forward ends pivoted to said track frames for flexibly connecting said unit to said tractor.

8. The combination with a crawler type tractor including vertical side frames and endless tracks trained about said frames, a universal earth working tool carrying unit attached thereto, said unit comprising a frame, two forwardly extending draft members secured to said last named frame and located outside said track frames, spaced apart plates secured to the forward ends of each of said draft members, draft links having one of their ends pivoted between said plates and the other of their ends pivoted to said vertical side frames and adjustable gauge wheels connected to said draft members for controlling the depth penetration of the earth working tools carried by said unit.

9. The combination with a crawler type tractor including vertical side frames and endless tracks trained about said frames, a universal earth working tool carrying wheeled frame unit attached thereto, said unit comprising a frame, two forwardly extending draft members secured to said last named frame and located outside said track frames, spaced apart plates secured to the forward ends of each of said draft members, and adjustable links pivoted between said plates and limited in their pivotal movement, the forward ends of said links being pivotally connected to said track frames for flexibly connecting said unit to said tractor.

10. The combination with a crawler type tractor including vertical side frames and endless tracks trained about said frames, of a universal earth working tool carrying unit attached thereto, forwardly extending draft members secured to said unit and extending forwardly towards said track frames, and means for floatingly connecting said draft members to the outsides of said track frames.

11. The combination with a crawler type tractor including vertical side frames and endless tracks trained about said frames, of an earth working tool carrying wheeled frame unit attached thereto, forwardly extending draft members secured to said unit and extending forwardly towards said track frames, and means for floatingly connecting the forward ends of said draft members to intermediate portions of said track frames.

12. The combination with a crawler type tractor including vertical side frames and endless tracks trained about said frames, of an earth working tool carrying wheeled frame unit attached thereto, forwardly extending draft members secured to said unit and extending forwardly towards said track frames, and means forming the connections between said draft members and intermediate portions of said track frames for permitting said draft members to move relative to said track frames as said tractor travels over uneven ground.

13. The combination with a crawler type tractor including vertical side frames and endless tracks trained about said frames, of a universal implement carrying unit attached thereto, said unit comprising a transversely extending frame, wheels for supporting the outer ends of said frame and means connecting said unit to said track frames whereby said unit may move relative to said track frames as said tractor moves over uneven ground.

RUDOLPH J. ALTGELT.
CAMERON H. GEMBERLING.